(12) United States Patent
Singh et al.

(10) Patent No.: US 9,658,048 B2
(45) Date of Patent: May 23, 2017

(54) COORDINATE MEASURING MACHINE WITH CARBON FIBER AIR BEARINGS

(71) Applicant: Hexagon Metrology, Inc., North Kingstown, RI (US)

(72) Inventors: Gurpreet Singh, Providence, RI (US); John Langlais, Coventry, RI (US); Jie Zheng, Mansfield, MA (US); Joseph G. Spanedda, Foster, RI (US)

(73) Assignee: Hexagon Metrology, Inc., North Kingstown, RI (US)

( * ) Notice: Subject to any disclaimer, the term of this patent is extended or adjusted under 35 U.S.C. 154(b) by 182 days.

(21) Appl. No.: 14/670,580

(22) Filed: Mar. 27, 2015

(65) Prior Publication Data

US 2015/0285608 A1    Oct. 8, 2015

Related U.S. Application Data

(60) Provisional application No. 61/975,045, filed on Apr. 4, 2014.

(51) Int. Cl.
| | |
|---|---|
| *G01B 5/008* | (2006.01) |
| *F16C 29/02* | (2006.01) |
| *G01B 1/00* | (2006.01) |
| *G01B 5/00* | (2006.01) |

(52) U.S. Cl.
CPC ............ *G01B 5/008* (2013.01); *F16C 29/025* (2013.01); *G01B 1/00* (2013.01); *G01B 5/0009* (2013.01); *G01B 5/0014* (2013.01)

(58) Field of Classification Search
CPC ..................................................... G01B 5/008

USPC .............................................................. 33/503
See application file for complete search history.

(56) References Cited

U.S. PATENT DOCUMENTS

| | | | |
|---|---|---|---|
| 4,833,789 A | 5/1989 | Zona ............................... 33/503 |
| 4,958,437 A * | 9/1990 | Helms .................... G01B 5/008 |
| | | | 33/1 M |
| 5,017,022 A | 5/1991 | Ruggles et al. .............. 384/100 |
| 5,189,805 A | 3/1993 | Matsumoto et al. ........... 33/503 |
| 6,202,316 B1 | 3/2001 | Swift et al. ..................... 33/503 |
| 6,272,760 B1 | 8/2001 | Wiedmann et al. ............ 33/503 |
| 6,428,210 B1 | 8/2002 | Kafai .............................. 384/12 |

(Continued)

FOREIGN PATENT DOCUMENTS

EP         2 623 926        8/2013         ............. G01B 11/00

OTHER PUBLICATIONS

"Ceramic vs. Aluminum CMMs: Which are Better?", Quality Digest, http://www.qualitydigest.com/rnarOO/htrnl/cmms.htrnl, 5 pages, 2000.

(Continued)

*Primary Examiner* — G. Bradley Bennett
(74) *Attorney, Agent, or Firm* — Sunstein Kann Murphy & Timbers LLP

(57) ABSTRACT

A coordinate measuring machine has a base for supporting an object, a movable assembly having a probe for measuring the object, and a rail movably guiding the movable assembly along its length. The rail includes carbon fiber and has a rail CTE. The coordinate measuring machine also has an air bearing member circumscribing the rail and fixedly coupled with the movable assembly. The air bearing member has a member CTE, which is about equal to the rail engineered CTE.

23 Claims, 3 Drawing Sheets

(56) References Cited

U.S. PATENT DOCUMENTS

| | | | |
|---|---|---|---|
| 7,191,541 B1* | 3/2007 | Weekers | B23Q 11/0003 33/503 |
| 2004/0205974 A1* | 10/2004 | Ogura | G01B 5/0009 33/503 |
| 2006/0062499 A1 | 3/2006 | Boyd | 384/100 |
| 2007/0271803 A1* | 11/2007 | Ishikawa | G01B 5/008 33/503 |
| 2010/0061676 A1 | 3/2010 | Sugiyama et al. | 384/625 |
| 2013/0111774 A1* | 5/2013 | McMurtry | G01B 5/0016 33/503 |
| 2013/0188895 A1 | 7/2013 | Devitt | 384/121 |
| 2013/0227851 A1* | 9/2013 | Singh | G01B 5/008 33/503 |
| 2014/0071460 A1* | 3/2014 | Suzuki | G01B 5/008 356/614 |
| 2014/0123509 A1* | 5/2014 | Furushima | G01B 7/28 33/503 |
| 2014/0222372 A1* | 8/2014 | Sprenger | G01B 5/008 702/155 |
| 2015/0052769 A1* | 2/2015 | Noda | G01B 21/047 33/503 |
| 2016/0003603 A1* | 1/2016 | Kawakami | G01B 5/008 33/503 |
| 2016/0131302 A1* | 5/2016 | Hirano | G01B 5/0002 33/568 |
| 2016/0195389 A1* | 7/2016 | Sagemueller | G05B 19/401 33/503 |

OTHER PUBLICATIONS

Gottschalk et al., "An Air Bearing Rotating Coil Magnetic Measuring System", Proceedings of 2005 Particle Accelerator Conference, Knoxville, TN, IEEE 2005, pp. 2038-2040.

"NEWWAY Air bearings", Linear Motion, http://www.newwayairbearings.com/solutions/applications/linear-motion, 3 pages, 2012.

International Searching Authority, International Search Report—International Application No. PCT/US2015/022905, dated Jun. 5, 2015, together with the Written Opinion of the International Searching Authority, 10 pages.

International Searching Authority, International Preliminary Report on Patentability—International Application No. PCT/US2015/022905, dated Mar. 8, 2016, 20 pages.

* cited by examiner

COORDINATE MEASURING MACHINE WITH CARBON FIBER AIR BEARINGS

PRIORITY

This patent application claims priority from provisional U.S. patent application No. 61/975,045, filed Apr. 4, 2014 entitled, "COORDINATE MEASURING MACHINE WITH CARBON AIR BEARINGS," and naming Gurpreet Singh, John Langlais, Jessica Zheng, and Joseph Spanedda as inventors, the disclosure of which is incorporated herein, in its entirety, by reference.

FIELD OF THE INVENTION

The invention generally relates to coordinate measuring machines and, more particularly, the invention relates to air bearings used in coordinate measuring machines.

BACKGROUND OF THE INVENTION

Among other things, coordinate measuring machines ("CMMs," also known as surface scanning measuring machines) measure geometry and surface profiles, or verify the topography of known surfaces. For example, a CMM may measure the topological profile of a propeller to ensure that its surface is appropriately sized and shaped for its specified task (e.g., moving a 24 foot boat at pre-specified speeds through salt water).

To that end, conventional CMMs typically have a base directly connected with and supporting a movable assembly having a probe that directly contacts and moves along a surface of an object being measured. The base also may support the object being measured. Commonly, the movable assembly forms an air bearing with a rail to permit movement along the rail—i.e., in a direction that is generally parallel with the longitudinal axis of the rail. If the air gap of the air bearing is not consistent, then the probe can move relative to the object. Undesirably, this movement can significantly skew the results of the measurement, particularly when measuring to the micron level.

SUMMARY OF VARIOUS EMBODIMENTS

In accordance with one embodiment of the invention, a coordinate measuring machine has a base for supporting an object, a movable assembly having a probe for measuring the object, and a fixed rail movably guiding the movable assembly along its length. The rail includes carbon (e.g., carbon fiber) and has a rail CTE. The coordinate measuring machine also has an air bearing member circumscribing the rail and fixedly coupled with the movable assembly. The air bearing member has a member CTE, which is about equal to the rail CTE. Various embodiments engineer the CTE of the bearing member to have the desired CTE.

The air bearing member may have a torroidally shaped member (e.g., a hollow cylinder) completely circumscribing the rail (e.g., the rail also may be a cylinder, among other shapes). Among other things, the torroidally shaped member may include a non-carbon material, such as metal or ceramic. Alternatively, the torroidally shaped member also may be formed from carbon (e.g., a carbon fiber composite).

The torroidally shaped member may have a groove for distributing air, and a plurality of through-holes fluidly connected with the groove for directing air toward the rail.

Some embodiments of the air bearing include a sleeve and at least one torroidally shaped member supported by the sleeve. The sleeve and at least one torroidally shaped members may be formed from different materials. Moreover, some implementations may form the air bearing by both sides of the rail, and the rail may be formed mostly from carbon fiber material. The air bearing preferably is a radial air bearing.

In accordance with another embodiment of the invention, a method provides a coordinate measuring machine having a movable assembly having a probe, a carbon rail movably guiding the movable assembly along its length, and an air bearing member circumscribing the rail and fixedly coupled with the movable assembly. The method also matches the CTE of the air bearing member with the CTE of the rail, and forces air through the air bearing member to form an air bearing with an air gap between the air bearing member and the rail.

The air gap preferably remains substantially constant across a plurality of temperatures when air is forced through the air bearing member and the air bearing is not moving along the rail. The method also may move the air bearing along the rail.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

DESCRIPTION OF ILLUSTRATIVE EMBODIMENTS

In illustrative embodiments, a coordinate measuring machine (a "CMM") has a more reliable air bearing system to move in two, three, or more directions, such as toward or away from its platform, or generally parallel to its platform. To that end, the CMM has carbon rails configured to match the coefficient of thermal expansion of at least part of its air bearing. Among others, the air bearing may include one or both of a radial air bearing and a thrust air bearing. Details of illustrative embodiments are discussed below.

Figure 1A:
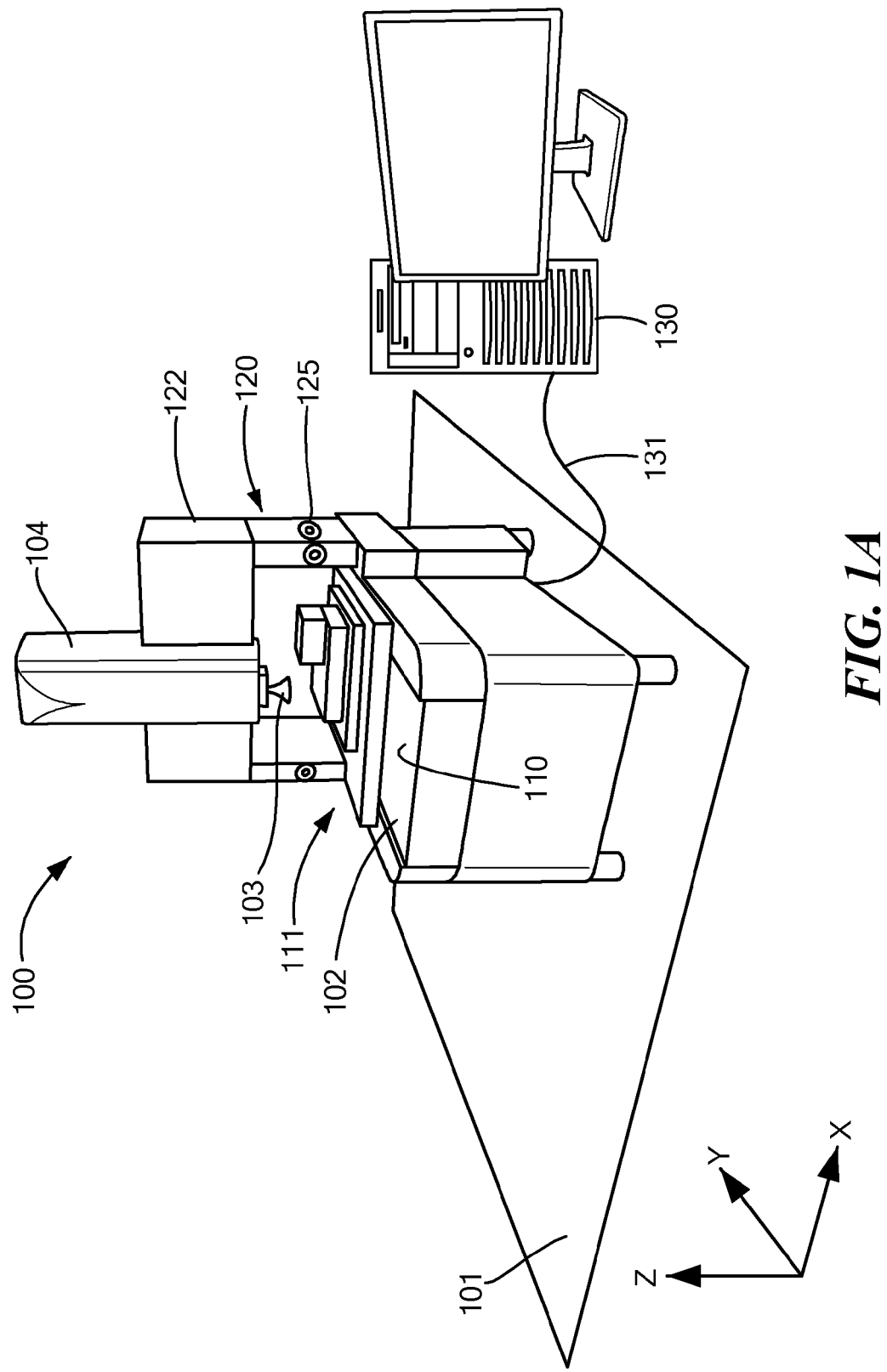
FIG. 1A schematically shows a coordinate measuring machine that may be configured in accordance with illustrative embodiments of the invention.

FIG. 1A is a photograph of one type of coordinate measurement machine 100 that may be configured in accordance with illustrative embodiments. As known by those in the art, the CMM 100, which is supported on a floor 101 in this picture, measures an object on its bed/table/base (referred to as "base 102"). Generally, the base 102 of the CMM 100 defines an X-Y plane 110 that typically is parallel to the plane of the floor 101.

To measure an object on its base 102, the CMM 100 has movable features 122 arranged to move a measuring device 103, such as a mechanical, tactile probe (e.g., a touch trigger or a scanning probe in a standard CMM), a non-contact probe (e.g., using laser probes), or a camera (e.g., a machine-vision CMM), coupled with a movable arm 104. Alternately, some embodiments move the base 102 with respect to a stationary measuring device 103. Either way, the movable features 122 of the CMM 100 manipulate the relative positions of the measuring device 103 and the object (or calibration artifact) with respect to one another to obtain the desired measurement. Accordingly, the CMM 100 can measure the location of a variety of features of the object or artifact.

The CMM 100 has a motion and data control system 120 that controls and coordinates its movements and activities. Among other things, the control system 120 includes computer processor hardware 121 and the noted sensors/movable features 122. The computer processor may include a microprocessor, programmable logic, firmware, advance control, acquisition algorithms, and analysis algorithms. The computer processor 121 may have on-board digital memory (e.g., RAM or ROM) for storing data and/or computer code, including instructions for implementing some or all of the control system operations and methods. Alternately, or in addition, the computer processor 121 may be operably coupled to other digital memory, such as RAM or ROM, or a programmable memory circuit for storing such computer code and/or control data.

Alternately, or in addition, some embodiments couple the CMM 100 with an external computer (or "host computer") 130. In a manner similar to the control system 120, the host computer 130 has a computer processor such as those described above, and computer memory in communication with the processor of the CMM 100. The memory is configured to hold non-transient computer instructions capable of being executed by the processor, and/or to store non-transient data, such as data acquired as a result of the measurements of an object on the base 102.

Among other things, the host computer 130 may be a desktop computer, a tower computer, or a laptop computer, such as those available from Dell Inc., or even a tablet computer, such as the iPad available from Apple Inc. The host computer 130 may be coupled to the CMM 100 via a hardwired connection, such as an Ethernet cable 131, or via a wireless link, such as a Bluetooth link or a WiFi link. The host computer 130 may, for example, include software to control the CMM 100 during use or calibration, and/or may include software configured to process data acquired during a calibration process. In addition, the host computer 130 may include a user interface configured to allow a user to manually operate the CMM 100.

Because their relative positions are determined by the action of the movable features 122, the CMM 100 may be considered as having knowledge about data relating to the relative locations of the base 102, and the object or artifact, with respect to its measuring device 103. More particularly, the computers 121 or 130 control and store information about the motions of the movable features 122. Alternately, or in addition, the movable features 122 of some embodiments include sensors that sense the locations of the table and/or measuring device 103, and report that data to the computers 121 or 130. The information about the motions and positions of the table and/or measuring device 103 of the CMM 100 may be recorded in terms of a two-dimensional (e.g., X-Y; X-Z; Y-Z) or three-dimensional (X-Y-Z) coordinate system referenced to a point on the CMM 100.

Figure 1B:
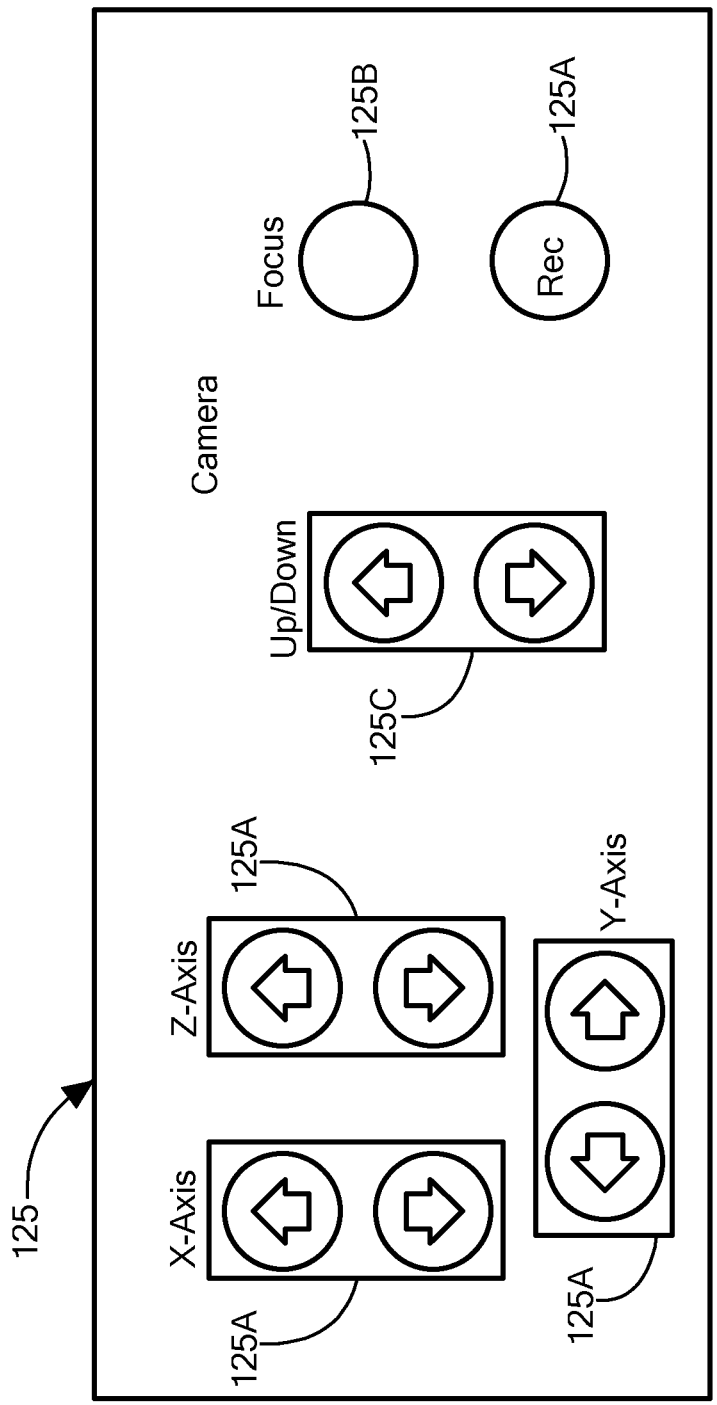
FIG. 1B schematically shows an interface panel that may be used with the coordinate measuring machine in accordance with illustrative embodiments of the invention.

Some CMMs also include a user interface 125 as shown in FIG. 1A and as further schematically illustrated in FIG. 1B. As shown, the user interface 125 may have control buttons 125A and knobs 125B that allow a user to manually operate the CMM 100. Among other things, the interface 125 may enable the user to change the position of the measuring device 103 or base 102 (e.g., with respect to one another) and to record data describing the position of the measuring device 103 or base 102.

In addition, the interface 125 may enable the user to focus a camera (if the measuring device 103/arm 104 includes a camera) on an object or target and record data describing the focus of the camera. In a moving table CMM, for example, the measuring device 103 may also be movable via control buttons 125C. As such, the movable features 122 may respond to manual control, or under control of the computer processor 121, to move the base 102 and/or the measuring device 103 (e.g., a mechanical probe in a mechanical CMM or a camera in a machine vision CMM 100) relative to one another. Accordingly, this arrangement permits the object being measured to be presented to the measuring device 103 from a variety of angles, and in a variety of positions.

Figure 2:
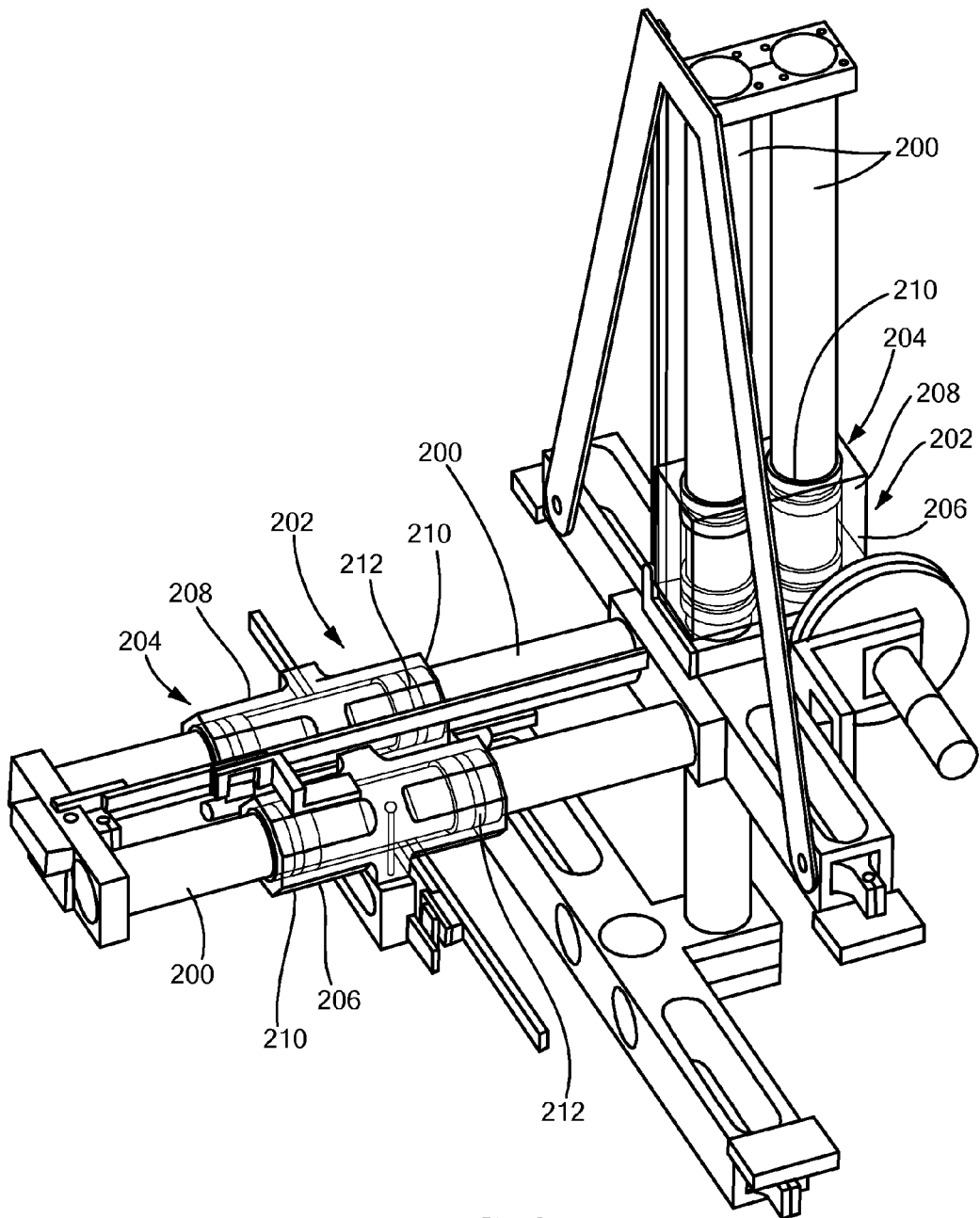
FIG. 2 schematically shows details of the electromechanical features of the coordinate measuring machine in accordance with illustrative embodiments.

FIG. 2 schematically shows some details of one implementation of the movable features 122 in accordance with illustrative embodiments of the invention. As noted above, the movable features 122 operate to move the arm 104 and its accompanying measurement device 103 in the X-direction (parallel to the base 102), the Y-direction (parallel to the base 102 but perpendicular to the X-direction), and in the Z-direction (toward and away from the base 102). To that end, the movable features 122 (or other related portion of the CMM 100) have at least three sets of rails/guides 200 that movably guide a movable assembly 202 (part of the movable features 122) in any of the X, Y, or Z directions. For simplicity, FIG. 2 shows two of those sets of rails 200—one for guiding in the Z-direction, and another for guiding in the X-direction. Those skilled in the art should understand that illustrative embodiments also can have a third set for guiding in the Y-direction. Alternative embodiments, however, may guide in different directions.

Although not shown in full, the rails 200 support and guide the movable assembly 202, which correspondingly moves the arm 104 and its measuring device 103 relative to the object being measured. To improve mechanical and functional efficiencies, the movable assembly 202 preferably couples with the rails 200 by means of an air bearing system 204. Specifically, as shown in FIG. 2, each rail 200 has an attendant air bearing member 206 riding on its outer surface (e.g., the bearing member 206 may circumscribe the rail outer surface). Accordingly, during normal use, the air bearing member 206 should not make contact with the rail 200.

To accomplish its primary function, each air bearing member 206 is considered to form a sleeve 208. To deliver the air and produce the so-called "floating" function of the air bearing, each end of the sleeve 208 supports/contains a rigid ring 210 for receiving high pressure air from an air external source, such as an external air pump. The ring 210 and sleeve 208 form a single, integrated object that makes up at least part of the air bearing member 206.

The air bearing member 206, including its ring 210 and/or sleeve 208 (housing), has channels 212 for distributing that air, and holes (not shown) for directing the air between the rail 200 and the ring/assembly. For example, FIG. 2 shows the ring 210 as having a groove for distributing air along the ring 210, and through the noted plurality of through-holes. These through-holes, which are fluidly connected with the groove, thus direct the pressurized air they receive from the groove through the ring 210 and toward the rail 200.

In this implementation, the CMM 100 has two parallel rails 200 in each of the X, Y, and Z directions to prevent the movable assembly 202 from rotating or pivoting around any its rail 200. Some embodiments have more than two parallel rails 200 in each direction, while designs with a single rail 200 can also accomplish the same goals. Accordingly, the movable assembly 202 has the same number of corresponding air bearing members 206, which are coupled with the arm 104 and other portions of the movable features 122. Movement of the movable assembly 202 thus produces a corresponding movement of the arm 104, enabling the CMM 100 to measure the object.

In accordance with illustrative embodiments, each rail 200 is formed at least in part from an anisotropic material, such as a carbon based material (e.g., graphite or other carbon fiber). During thermal cycling or other thermal changes, the rails 200 expand and contract substantially the same way as the ring 210. The carbon rails 200 radially react to heat in this manner similar to the radial reaction of a metal rail. Some embodiments, however, may permit a change in shape longitudinally while ensuring no shape changes radially.

In addition, each carbon rail 200 is engineered/selected to have a coefficient of thermal expansion ("CTE") that is generally matched to that of the ring 210. Accordingly, both the ring 210 and its rail 200 can have about the same CTE, subject to engineering tolerances. For example, both the ring 210 and rail 200 could have CTE values that are equal to within a prescribed decimal place (e.g., 7.1×10−6 per degree C.), or within 2-5 percent. While illustrative embodiments form all ring and rail pairs on a single CMM 100 so that they have the same CTE, some alternative embodiments have pairs of rails 200 and rings 210 with a first CTE, and other pairs of rails 200 and rings 210 with a second, different CTE.

As known by those in the art, during use, the annular space/clearance between the outer surface of the rail 200 and the inner surface of the air bearings often is quite small. Some of those spaces can be on the order of microns (e.g., about ten microns). That space should be maintained substantially constant to ensure proper CMM operation. Matching the CTEs thus ensures that this space should stay generally stable (e.g., within 5, 10, or 15 percent of its nominal space). This is in contrast to prior art CMM designs having rails with different CTEs and/or CMM designs having rails formed from anisotropic materials. Maintaining a small but constant annular gap with such prior art rails has been quite challenging and, if not effectively maintained, can reduce the performance of an underlying CMM 100.

The entire air bearing member 206 can be formed from a single material, or only the rings 210 can be made from the CTE matching material. Among other things, the rings 210 and/or remainder of the air bearing member 206 (e.g., the sleeve 208) can be formed from a ceramic, or the rings 210 can be formed from ceramic while at least a portion of the rest of the sleeve 208 includes aluminum. Other embodiments may form the rings 210 from metal or carbon. The holes and air movement system within the air bearing member 206 preferably include jets formed from a hard material, such as sapphire. Of course, the rings 210 and rest of the air bearing member 206 can be formed from a wide variety of other materials. Discussion of those specific materials thus is for illustrative purposes only.

Various embodiments form the rings 210 to have a shape that corresponds with the outer shape of the rails 200. For example, if the rail 200 has a round outer cross-sectional shape, then the rings 210 can have a toroidal shape. In fact, the interior of the ring 210 can have the same shape as the outer surface of the rail 200, but have a different outside shape. Alternatively, if the rails 200 have a square, rectangular, triangular, irregular, or other cross-sectional/external shape, the rings 210 preferably have the same interior shape and preferably are formed on all sides of the rail 200. Accordingly, use of the term "ring" is not intended to be limited to toroidally shaped members, or other types of round members.

Carbon based rails 200 provide a number of benefits. Primarily, carbon can be engineered to be very strong and stiff and yet, be lighter than conventional materials used with prior art CMMs. For example, many conventional CMMs use steel, ceramic, or granite rails, which are heavier and yet, when compared to carbon fiber, provide lower strength or stiffness advantages. The CMM 100 of FIG. 2, with its carbon-based rails 200, thus can deliver the same or better performance with lighter materials.

Moreover, carbon is a natural lubricant. Accordingly, if one of the rings 210 does scrape against the rail 200, such as at startup, shut down, or during an unintended malfunction, the carbon rails 200 should provide some beneficial crash protection to minimize damage.

During use, an air source forces air through tubes (not shown) to the air channels 212 on the air bearing member 206. This preferably creates a substantially constant-thickness layer of air that substantially surrounds a portion of the relevant rail 200—primarily around the rings 210. At this point, the movable features 122 (e.g., the arm 104) can move as required by the application. During this time, each air bearing continues to maintain a substantially constant clearance with its rail 200. In fact, the clearance should remain substantially the same both when the air bearing is moving along the rail 200, and when the air bearing is not moving along the rail 200.

When the CMM 100 is no longer operating, it may power down, thus stopping the flow of air to the air bearing member 206. As noted above, this may cause contact with between the rail 200 and the ring 210 and/or rest of the bearing member. During normal use, this contact should have less impact than prior art rings known by the inventors due to the lubricating nature of carbon.

Although the above discussion discloses various exemplary embodiments of the invention, it should be apparent that those skilled in the art can make various modifications that will achieve some of the advantages of the invention without departing from the true scope of the invention.

What is claimed is:

1. A coordinate measuring machine comprising:
   a base for supporting an object;
   a movable assembly having a probe for measuring the object;
   a rail guiding the movable assembly along its length, the rail comprising carbon and having a rail CTE; and
   an air bearing member circumscribing the rail and fixedly coupled with the movable assembly, the air bearing member forming a radial air bearing with the rail and having a member CTE,
   the rail CTE being about equal to the member CTE.

2. The coordinate measuring machine as defined by claim 1 wherein the rail comprises carbon fiber.

3. The coordinate measuring machine as defined by claim 2 wherein the air bearing member comprises a torroidally shaped member completely circumscribing the rail.

4. The coordinate measuring machine as defined by claim 3 wherein the torroidally shaped member comprises metal or ceramic.

5. The coordinate measuring machine as defined by claim 3 wherein the torroidally shaped member comprises carbon.

6. The coordinate measuring machine as defined by claim 3 wherein the torroidally shaped member includes a groove for distributing air and a plurality of through-holes fluidly connected with the groove for directing air toward the rail.

7. The coordinate measuring machine as defined by claim 1 wherein the air bearing includes a sleeve and at least one ring member supported by the sleeve.

8. The coordinate measuring machine as defined by claim 7 wherein the sleeve and at least ring are formed from different materials.

9. The coordinate measuring machine as defined by claim 1 wherein air bearing is formed on more than one side of the rail, the rail being formed mostly from carbon material.

10. The coordinate measuring machine as defined by claim 1 further comprising at least one additional rail and at least one additional air bearing member circumscribing the additional rail and fixedly coupled with the movable assembly, the additional rail having an additional rail CTE, the at least one additional air bearing member having an additional member CTE, the additional rail CTE being about equal to the additional member CTE.

11. A method comprising:
providing a coordinate measuring machine having a movable assembly having a probe, a carbon rail movably guiding the movable assembly along its length, and an air bearing member circumscribing the rail and fixedly coupled with the movable assembly, the CTE of the air bearing member matching with the CTE of the rail; and
forcing air through the air bearing member to form an air bearing with an air gap between the air bearing member and the rail.

12. The method as defined by claim 11 wherein the air gap remains substantially constant across a plurality of temperatures when air is forced through the air bearing member and the air bearing is not moving along the rail.

13. The method as defined by claim 11 further comprising moving the air bearing along the rail.

14. The method as defined by claim 11 wherein the air bearing member comprises a torroidally shaped member completely circumscribing the rail.

15. The method as defined by claim 14 wherein the torroidally shaped member comprises a non-carbon material.

16. The method as defined by claim 15 wherein the torroidally shaped member comprises metal or ceramic.

17. The method as defined by claim 14 wherein the torroidally shaped member comprises carbon.

18. The method as defined by claim 14 wherein the torroidally shaped member includes a groove for distributing air and a plurality of through-holes fluidly connected with the groove, the method forcing the air through the through-holes.

19. The method as defined by claim 11 wherein the air bearing includes a sleeve and at least one torroidally shaped member supported by the sleeve.

20. The method as defined by claim 19 wherein the sleeve and at least one torroidally shaped member are formed from different materials.

21. The method as defined by claim 19 wherein the sleeve has a rectangular outside shape.

22. The method as defined by claim 11 wherein the air bearing comprises a radial air bearing or a thrust air bearing.

23. The coordinate measuring machine as defined by claim 3 wherein the torroidally shaped member comprises a non-carbon material.

* * * * *